(12) United States Patent
Piga et al.

(10) Patent No.: US 12,608,876 B2
(45) Date of Patent: Apr. 21, 2026

(54) METHOD FOR CALCULATING ONE OR MORE ISOVISTS OF A PHYSICAL OR EXTENDED REALITY ENVIRONMENT

(71) Applicants: Politecnico di Milano, Milan MI (IT); Università degli Studi di Milano, Milan (IT)

(72) Inventors: Barbara Ester Adele Piga, Milan (IT); Gabriele Stancato, Milan (IT); Marco Boffi, Milan (IT); Nicola Rainisio, Milan (IT); Paolo Ceravolo, Milan (IT); Gabriel Marques Tavares, Milan (IT)

(73) Assignees: Politecnico di Milano, Milan (IT); Università degli Studi di Milano, Milan (IT)

( * ) Notice: Subject to any disclaimer, the term of this patent is extended or adjusted under 35 U.S.C. 154(b) by 135 days.

(21) Appl. No.: 18/572,888

(22) PCT Filed: Jun. 23, 2022

(86) PCT No.: PCT/IB2022/055823
§ 371 (c)(1),
(2) Date: Dec. 21, 2023

(87) PCT Pub. No.: WO2023/275679
PCT Pub. Date: Jan. 5, 2023

(65) Prior Publication Data
US 2024/0371080 A1     Nov. 7, 2024

(30) Foreign Application Priority Data
Jun. 30, 2021    (IT) ........................ 102021000017168

(51) Int. Cl.
| | |
|---|---|
| *G06F 3/01* | (2006.01) |
| *G06T 15/20* | (2011.01) |
| *G06F 3/0338* | (2013.01) |

(52) U.S. Cl.
CPC .............. *G06T 15/20* (2013.01); *G06F 3/012* (2013.01); *G06F 3/0338* (2013.01)

(58) Field of Classification Search
CPC ....... G06T 15/20; G06F 3/012; G06F 3/0338; G06F 3/011; G06V 20/20
See application file for complete search history.

(56) References Cited

U.S. PATENT DOCUMENTS

| | | | | |
|---|---|---|---|---|
| 8,854,282 | B1 * | 10/2014 | Wong ........................ | G06F 3/14 345/7 |
| 8,896,522 | B2 * | 11/2014 | Valik ....................... | G06F 3/017 345/633 |

(Continued)

OTHER PUBLICATIONS

International search report and written opinion dated Aug. 8, 2022; Application No. PCT/IB2022/055823; 7 pages.

(Continued)

*Primary Examiner* — Said Broome
(74) *Attorney, Agent, or Firm* — RANKIN, HILL & CLARK LLP; Erik J. Overberger

(57) ABSTRACT

The present invention relates to a method for calculating one or more isovists of a physical or extended reality environment, comprising the following steps: providing at least one electronic acquisition device configured to obtain a plurality of georeferenced data, such as time, position, orientation, and configured to take frames of the physical or extended reality environment; calculating a positioning parameter for each user, each positioning parameter being representative of a positioning point of a respective user in the physical or extended reality environment and being determined from the georeferenced position data acquired when said respective user uses the electronic acquisition device to take a frame of the physical or extended reality environment; calculating an (Continued)

aim parameter for each user, each aim parameter being representative of the direction of a respective frame of the physical or extended reality environment taken by a user at the respective positioning point and being calculated from the georeferenced orientation data acquired when such respective user uses the electronic acquisition device to take the frame; associating each positioning parameter with a respective aim parameter to define respective data units; grouping into respective positioning sets data units having respective positioning parameters differing from each other by a value lower than a positioning threshold value and respective aim parameters differing from each other by a value lower than an aim threshold value; calculating at least one isovist for each positioning set as a function of the respective positioning and/or aim parameters; representing each calculated isovist in a graphical user interface of an electronic display device.

7 Claims, 3 Drawing Sheets

(56) References Cited

U.S. PATENT DOCUMENTS 8,922,589 B2 * 12/2014 Laor ..................... G06T 19/006
345/633

2012/0249741 A1 * 10/2012 Maciocci .............. G06T 19/006
348/51
2016/0357491 A1 * 12/2016 Oya ...................... G06T 19/006
2018/0330542 A1 * 11/2018 Bharti ................ G02B 27/0172

OTHER PUBLICATIONS

Benedikt ML: "To take hold of space: isovists and isovist fields", Environment and Planning B, Feb. 12, 1979 (Feb. 12, 1979).
Peter G Scupelli et al: "Using isovist views to study placement of large displays in natural settings", Proceedings of The 2007 Conference on Human Factors in Computing Systems, CHI 2007, San Jose, California, USA, Apr. 28-May 3, 2007, ACM, 2 Penn Plaza, Suite 701 New York NY 10121-0701 USA, Apr. 28, 2007 (Apr. 28, 2007).
Capille Caue et al: "Disciplined Informality: Assembling unprogrammed spatial practices in three public libraries in Medellin", Proceedings of the 10th International Space Syntax Symposium, Jul. 1, 2016 (Jul. 1, 2016), XP055896936, Retrieved from the Internet: URL:https://www.researchgate.net/profile/Caue-Capille/publication/.

* cited by examiner

METHOD FOR CALCULATING ONE OR MORE ISOVISTS OF A PHYSICAL OR EXTENDED REALITY ENVIRONMENT

TECHNICAL FIELD

The present invention relates to a method for calculating one or more isovists of a physical or extended reality environment. The isovist calculated by the method of the present invention may be used, for example, to assess the perception of one or more users about a physical or extended reality environment.

State of the Art

It is well known in the background art to calculate a physical environment isovist, i.e. to calculate the set of all the points visible to a user at a given positioning within such a physical environment.

A calculation method is therefore known which, from a user's positioning point within a physical environment, reconstructs the portion of such physical environment potentially visible to such user at the positioning point.

For example, a method for calculating an isovist is shown in the document "Benedikt, M. L. (1979). To Take Hold of Space: Isovists and Isovist Fields. Environment and Planning B: Planning and Design, 6 (1), 47-65".

It is also known that the calculated isovist can be displayed in a 2D or 3D graphical representation of the physical environment to which that isovist relates.

Problem of the Prior Art

However, the isovists calculated using the prior art method are only relative to a single user.

In other words, the isovist calculated using the prior art method represents the portion of the environment potentially visible to a single individual.

Consequently, if it is necessary to assess the portion of the environment visible to several users, it is necessary to calculate a number of isovists equal to the number of users.

As the number of users increases, the graphical representation of isovists and their reading may become particularly complex.

In particular, displaying a high number of isovists on the same environment graphical representation is difficult to understand and therefore of little relevance.

SUMMARY OF THE INVENTION

In this context, the technical task underlying the present invention is to provide a method for calculating one or more isovists of a physical environment or extended reality that overcomes the problems of the prior art.

In particular, it is an aim of the present invention to propose a method for calculating one or more isovists of a physical or extended reality environment that allows the calculated isovists to be easily read, even in the case of a high number of users taken into consideration.

It is also an aim of the present invention to propose a computer programme to calculate one or more isovists of a physical or extended reality environment.

The technical task stated and the aims specified are substantially achieved by a method for calculating one or more isovists of a physical or extended reality environment comprising the technical characteristics set forth in one or more of the accompanying claims.

Advantages of the Invention

The method described makes it possible to reduce the number of isovists calculated in case of a high number of users considered by simplifying the subsequent reading of represented isovists. Advantageously, the method described makes the reading of the calculated isovists more immediate and relevant.

In addition, the method described allows the calculated isovists to be used to represent the perception of users within the physical or extended reality environment taken into consideration.

BRIEF DESCRIPTION OF THE DRAWINGS

Further features and advantages of the present invention will become clearer from the indicative, and therefore non-limiting, description of a preferred, but not exclusive, embodiment of a method for calculating one or more isovists of a physical or extended reality environment, as illustrated in the accompanying drawings wherein.

DETAILED DESCRIPTION

Figure 1:
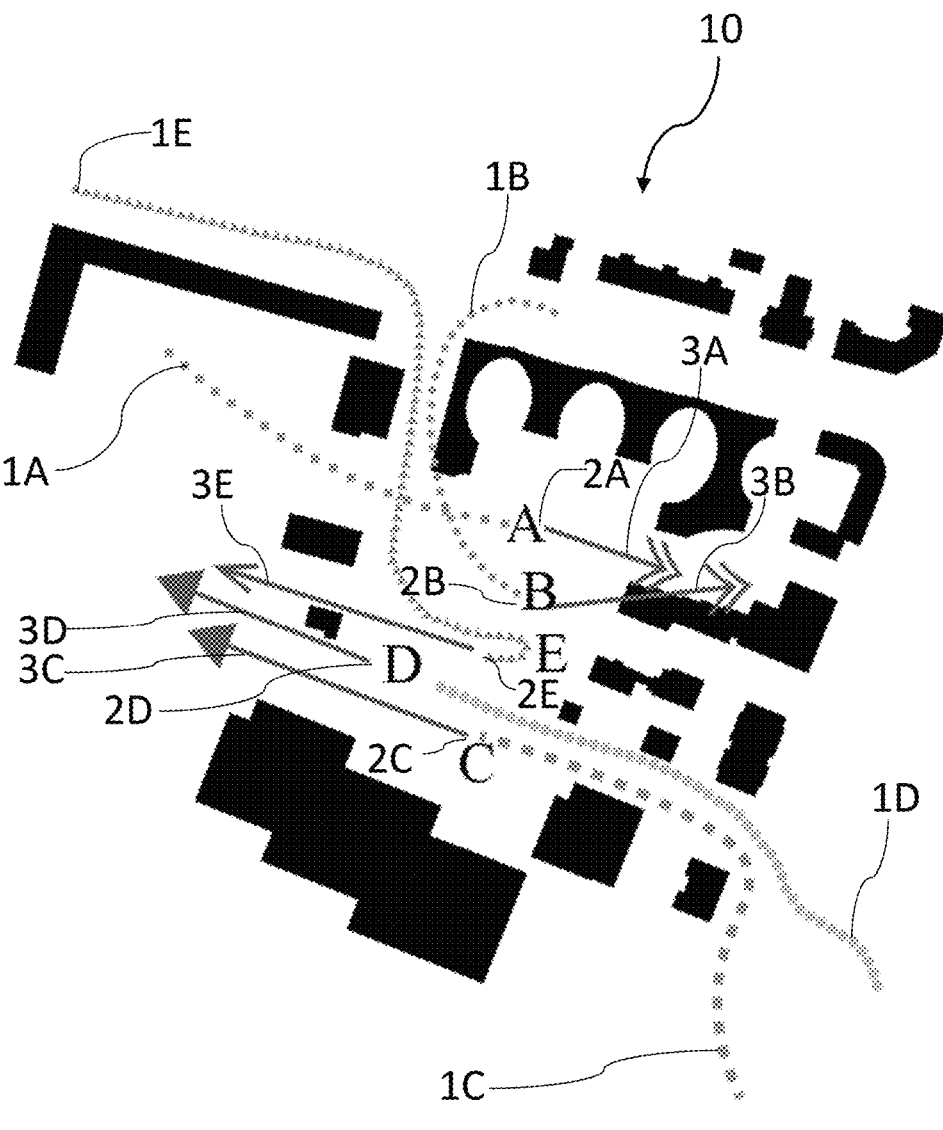
FIG. 1 is a schematic representation of a physical environment and of the respective path made by a set of users in such physical environment.

It is the object of the present invention a method for calculating one or more isovists of a physical or extended reality environment.

As it is well known to the person skilled in the art, the term isovist means the set of all the points visible to one or more users at a given positioning point within such physical or extended reality environment.

At the same time, as is well known to the person skilled in the art, the term "Extended Reality (XR)" denotes technologies that include all the possible combinations of real and virtual environments. The various extended reality technologies differ according to the relation between the real and virtual world. Extended reality technologies include, for example, "Mixed Reality (MR)"-including, among others, "Augmented Reality (AR)"—and "Virtual Reality (VR)".

As is well known to the person skilled in the art, the augmented reality technology makes it possible, for example, to overlap virtual objects and information onto the real world, while virtual reality technology makes it possible to create a completely computer-generated environment.

An extended reality environment thus means, for example, a physical environment onto which one or more virtual structures are overlapped by means of augmented reality technology or a completely virtual environment generated by means of virtual reality technology.

The extended reality environment corresponds, for example, to a simulation of the appearance of a physical environment after redeveloping and/or renovating that physical environment.

It is also worth underlying that each isovist, calculated by the method of the present invention, is relative to one or more users. Preferably, each isovist is related to several users.

Such method comprises the step of providing at least one electronic acquisition device configured to obtain a plurality of georeferenced data, including time, position, orientation, and configured to take frames of such physical or extended reality environment.

For example, such an electronic acquisition device corresponds to a smartphone comprising a GPS tracker and orientation sensors such as, accelerometer and gyroscope.

Furthermore, for example, the smartphone comprises a camera configured to acquire single images and/or sequential images of the physical or extended reality environment.

Furthermore, for example, the electronic acquisition device corresponds to an augmented reality visor that, when worn by a user, makes it possible to a user to explore a virtual environment.

Furthermore, for example, the electronic acquisition device corresponds to a computer that, via a graphical interface thereof, makes it possible to a user to explore images of a real environment, images of a virtual environment or images of a real environment onto which virtual elements have been overlapped.

Preferably, the method comprises the step of providing such an electronic acquisition device for each user taken into consideration.

Next, the method comprises the step of calculating a positioning parameter for each user.

Each positioning parameter is representative of a positioning point of a respective user in that physical or extended reality environment and is determined from the georeferenced position data acquired when that respective user uses the electronic acquisition device to take a frame of the physical or extended reality environment. In other words, for example, each positioning parameter is representative of the positioning point at which the respective user frames a portion of the physical or extended reality environment by means of the respective electronic acquisition device.

It is worth underlying that the frame may be taken by a user using a smartphone camera or by simply observing a portion of an extended reality environment with an augmented reality visor or via the graphical user interface of a computer.

Furthermore, for example, in case the electronic acquisition device corresponds to a smartphone, each positioning parameter is calculated from a respective georeferenced position data processed from latitude, longitude and altitude data acquired by the GPS tracker of that smartphone. If, on the other hand, the electronic acquisition device corresponds to a computer or an augmented reality visor, each positioning parameter is calculated from a respective georeferenced position data processed from data obtained by a user's localisation software in an extended reality environment.

The method also comprises the step of calculating an aim parameter for each user. Each aim parameter is representative of the direction of a respective frame of the physical or extended reality environment taken by a user at the respective positioning point and is calculated from the georeferenced orientation data acquired when the respective user uses the electronic acquisition device to take the frame.

In other words, for example, each aim parameter is representative of the frame direction in which the respective user frames a portion of the physical or extended reality environment by means of the respective electronic acquisition device.

In case the electronic acquisition device corresponds to a smartphone, each aim parameter is calculated from georeferenced orientation data processed by the gyroscope data (yaw, pitch and roll) of that smartphone. If, on the other hand, the electronic acquisition device corresponds to a computer or an augmented reality visor, each orientation parameter is calculated from a respective georeferenced orientation data processed, for example, from data obtained by a user's software calculating the frame direction.

After calculating the positioning and aim parameters, the method comprises the step of associating each positioning parameter with a respective aim parameter to define respective data units. Each data unit is relative to a respective user.

In addition, the method comprises the step of defining a positioning threshold and an aim threshold.

After defining the positioning threshold and the aim threshold, the method comprises the step of grouping, into respective positioning sets, data units having respective positioning parameters differing from each other by a value lower than the positioning threshold and respective aim parameters differing from each other by a value lower than the aim threshold.

In other words, data units are grouped not only according to the spatial distance between the positioning points of the respective users, but also according to the difference between the frame direction of the respective users.

Consequently, two data units having respective positioning parameters differing from each other by a value lower than the positioning threshold may be grouped into two separate positioning sets if their respective aim parameters differ from each other by a value higher than the aim threshold. In other words, data units relative to users that are close in the physical environment but with different frame directions may be grouped into distinct positioning sets.

After defining the positioning sets, the method comprises the step of calculating at least one isovist for each positioning set according to the respective positioning and/or aim parameters.

Each calculated isovist takes into account the occluding effect of the elements present in the physical or extended reality environment, making it possible to represent the portion of the physical or extended reality environment actually visible for each positioning set as a function of the respective positioning and/or aim parameters.

Following the calculation of the isovists, the method comprises the step of representing each isovist calculated in a graphical interface of an electronic display device.

For example, such an electronic display device corresponds to a smartphone or a computer.

It is worth underlying that each calculated isovist may be a two- or three-dimensional isovist and thus be represented in a two- or three-dimensional graphical representation of the physical or extended reality environment.

It is worth underlying that, having grouped the positioning and aim parameters, the number of isovists calculated is extremely reduced, thus also simplifying displaying them on a graphical interface.

In accordance with the preferred embodiment of the invention, before the step of calculating at least one isovist for each positioning set the method comprises the step of calculating a path parameter for each user.

Each path parameter is representative of the path performed by a respective user in such physical or extended reality environment to reach the respective positioning point and is calculated from georeferenced position data acquired during the path performed by the respective user in such physical or extended reality environment using the electronic acquisition device.

In other words, for example, each path parameter is representative of the path made by a respective user between a starting point, located in the physical or extended reality environment, and the respective positioning point, still located in that physical or extended reality environment.

It is worth underlying that the path made by each user in the physical or extended reality environment may be seen as a set of discrete points between the respective starting point and the respective positioning point. In addition, it is possible to obtain a respective positioning and aim parameter for each discrete point on the path.

Still according to the preferred embodiment of the invention, prior to the step of calculating at least one isovist for each positioning set the method comprises the step of adding each defined path parameter to a respective data unit. In other words, each path parameter relative to a respective user is added to the data unit of such respective user.

Still according to the preferred embodiment of the invention, prior to the step of calculating at least one isovist for each positioning set, the method includes the step of defining a path threshold.

After defining the path threshold and prior to the step of calculating at least one isovist for each positioning set, the method comprises the step of comparing the path parameters of the data units of each defined positioning set in order to group into respective observation sets data units of a respective positioning set having respective path parameters differing from each other by a value lower than the path threshold.

Each observation set thus constitutes a subset of a respective positioning set.

Consequently, two data units, grouped in the same positioning set, may be grouped into distinct observation sets.

In fact, even if such data units are related to users with respective positioning points close to each other in the physical or extended reality environment and with essentially the same frame direction, such data units may be grouped into distinct observation sets in the event that the respective users have reached their respective positioning points by making different paths.

For example, two users may travel different paths from starting points spaced far from each other in the physical or extended reality environment.

Optionally, after defining the observation sets and prior to the step of calculating at least one isovist for each positioning set, the method includes the step of updating each defined observation set taking into account descriptive parameters of each user of such respective observation set. Descriptive parameters include, for example, personal data, feelings and opinions.

According to the preferred embodiment of the invention, the step of calculating at least one isovist for each positioning set comprises calculating an isovist for each observation set according to the respective positioning and/or aiming parameters.

According to the preferred embodiment of the invention, the step of calculating an isovist for each observation set according to the respective positioning and/or aiming parameters comprises calculating an average positioning parameter for each defined observation set.

Each average positioning parameter is representative of the average value of the positioning parameters of the respective observation set.

Each average value of the positioning parameters of a respective observation set corresponds to a point located in the physical or extended reality environment.

In other words, each average positioning parameter corresponds to a point located in the physical or extended reality environment.

After calculating the average positioning parameters, the step of calculating an isovist for each observation set as a function of the respective positioning and/or aim parameters includes calculating an isovist for each observation set as a function of the respective average positioning parameters.

The isovist calculated as a function of a respective average positioning parameter represents the entire portion of the physical or extended reality environment potentially visible at 360° from the point in the physical or extended reality environment corresponding to such average positioning parameter.

Still according to the preferred embodiment of the invention, the step of calculating an isovist for each observation set as a function of the respective positioning and/or aim parameters comprises calculating an average aim parameter for each defined observation set.

Each average aim parameter is representative of the average value of the aim parameters of the respective observation set.

In other words, each aim parameter is representative of an average frame direction of the physical or extended reality environment.

After calculating the average aim parameters, the step of calculating an isovist for each observation set as a function of the respective positioning and/or aim parameters comprises calculating an isovist for each observation set as a function of the respective average positioning and aim parameters.

Referring in particular to the attached figures, an example of an isovist calculation using the method of the present invention is shown.

Specifically, in the example shown in FIG. 1, a first A, a second B, a third C, a fourth D and a fifth E user are taken into consideration. Each user A, B, C, D, E has made a respective path 1A, 1B, 1C, 1D, 1E in a physical environment, corresponding to a zone 10 of a city, to reach a respective positioning point 2A, 2B, 2C, 2D, 2E in such zone 10. In addition, each user has framed a portion of such zone 10 along a respective frame direction 3A, 3B, 3C, 3D, 3E by means of a respective electronic acquisition device.

By applying the method of the present invention, a first observation set, comprising the data units of the first user A and the second user B, a second observation set, comprising the data units of the third user C and the fourth user D, and a third observation set, comprising the data unit of the fifth user E, are defined.

In fact, even though the fifth user E is similar to the third user C and fourth user D in terms of positioning and frame direction, the path made by the fifth user E is different from that of the third user C and fourth user D.

In fact, the fifth user E starts from a respective starting position located at the north-west of zone 10, while the third user C and the fourth user D start from respective starting positions located at the south-east of zone 10.

Figure 2:
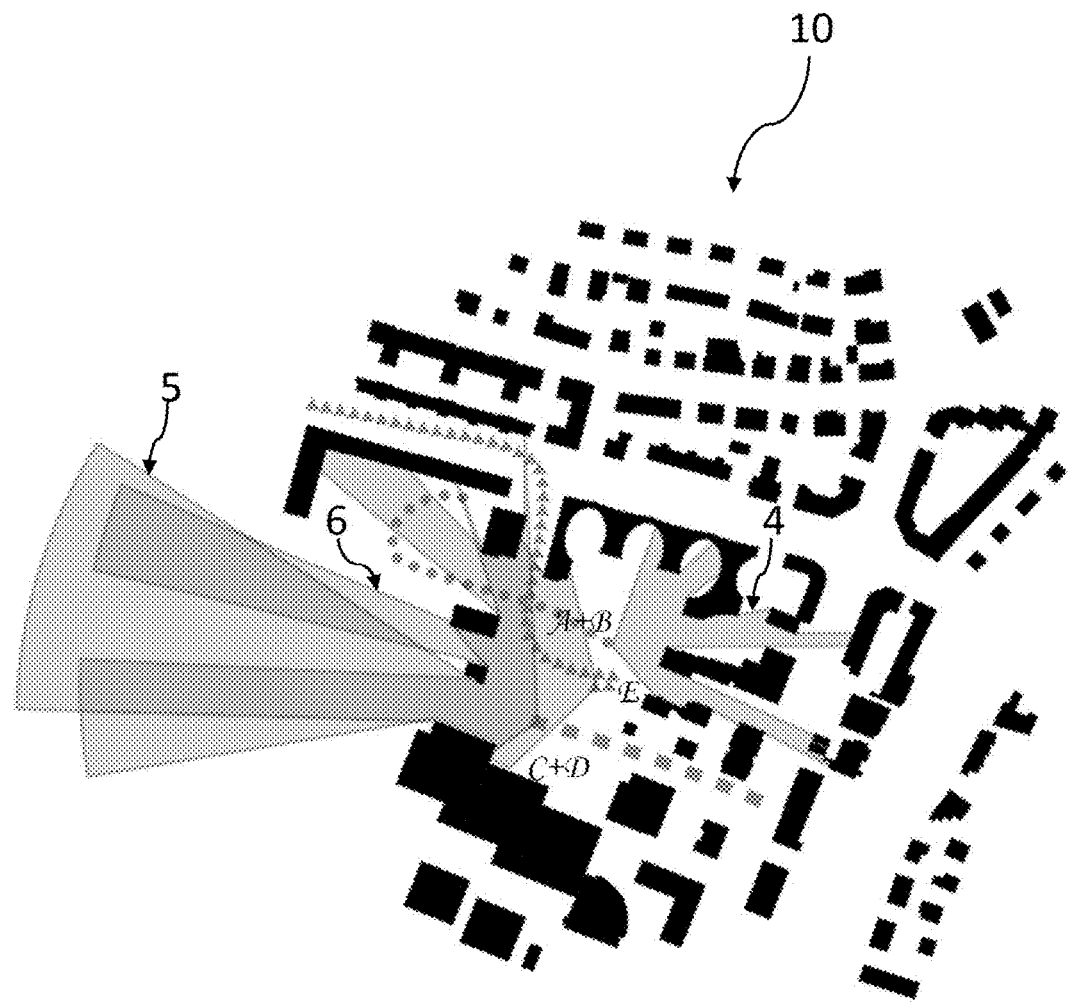
FIG. 2 is a schematic representation of the physical environment of FIG. 1 and isovists calculated by the method of the present invention.

Still by means of the method object of the present invention and as shown, for example, in FIG. 2, a first 4, a second 5 and a third isovist 6 are calculated for the first, second and third observation sets, respectively, and represented in the graphical interface of the electronic acquisition device.

Advantageously, in the case represented, instead of having to calculate five isovists, i.e. one for each user A, B, C, E, D, the method described makes it possible to reduce the number of calculated isovists to three, thus simplifying subsequently displaying them on a graphical interface.

According to a preferred aspect of the invention, prior to the step of representing each isovist calculated in a graphical user interface of an electronic display device, the method comprises collecting a set of subjective information for each user via the electronic acquisition device.

For example, subjective information is collected by asking the user targeted questions via the electronic acquisition device when the user frames the physical or extended reality environment.

Each set of subjective information relates to the perception of a respective user within the physical or extended reality environment.

For instance, each set of subjective information relates to a respective user's evaluation of the emotions felt when looking at a portion of a landscape within a physical or extended reality environment.

Also prior to the step of representing each isovist in a graphical interface of an electronic display device, the method includes processing a perception parameter for each set of subjective information. Each perception parameter is therefore relative to a respective user.

After processing the perception parameters and prior to the step of representing each isovist in a graphical interface of an electronic display device, the method comprises defining an average perception parameter for each defined observation set.

Each average perception parameter is representative of the average value of the perception parameters for a respective observation set.

Also, according to a preferred aspect, the step of representing each isovist in a graphical interface of an electronic display device comprises associating each calculated isovist with a graphical pattern according to the average perception parameter of the respective observation set.

Finally, still preferably, the step of representing each isovist in a graphical interface of an electronic display device comprises representing each isovist and the corresponding graphical pattern in a representation of the physical or extended reality environment and displaying this representation in the graphical interface of the electronic display device. Advantageously, subjective information may be associated with each calculated and represented isovist.

Figure 3:
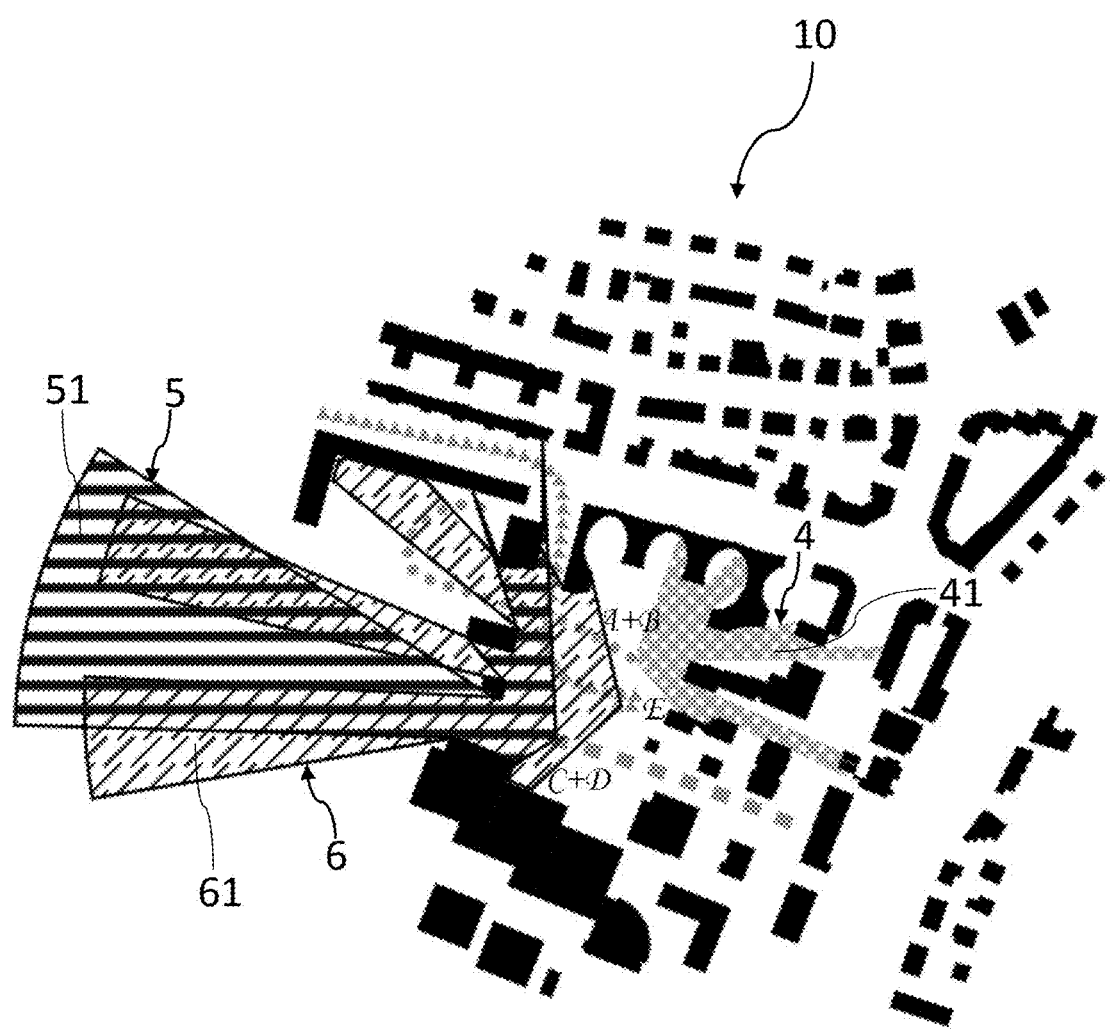
FIG. 3 is a schematic representation of the physical environment of FIG. 1 and of isovists, with the respective graphical pattern, calculated by the method of the present invention.

In the example shown in the attached figures and as visible in FIG. 3, the first 4, the second 5 and the third isovist 6 are associated respectively with a first 41, a second 51 and a third 61 graphical pattern.

A computer programme for calculating one or more isovists of a physical or extended reality environment is also an object of the present invention.

Such a computer programme comprises program codes adapted to perform the steps of the described method when the programme is run on a computer.

The invention claimed is:

1. A method for calculating one or more isovists of a physical or extended reality environment, each isovist being related to one or more users, wherein said method comprises the steps of:

providing at least one electronic acquisition device configured to obtain a plurality of georeferenced data, comprising position, orientation and configured to take frames of said physical or extended reality environment;

calculating a positioning parameter for each user, each positioning parameter being representative of a positioning point of a respective user in said physical or extended reality environment and being determined from said georeferenced position data acquired when said respective user uses the electronic acquisition device to take a frame of the physical or extended reality environment;

calculating an aim parameter for each user, each aim parameter being representative of the direction of the respective frame of the physical or extended reality environment taken by a user at the respective positioning point and being calculated from said georeferenced orientation data acquired when said respective user uses the electronic acquisition device to take the respective frame;

associating each positioning parameter with a respective aim parameter to define respective data units;

defining a positioning threshold and an aim threshold;

grouping data units having respective positioning parameters and respective aim parameters into respective positioning sets, the step of grouping data units comprising the step of grouping respective positioning sets of data units having respective positioning parameters differing from each other by a value lower than the positioning threshold and respective aim parameters differing from each by a value lower than the aim threshold;

calculating one or more isovists for each positioning set according to the respective positioning and/or aim parameters, at least one of said one or more isovists being related to several users;

representing each isovist calculated in a graphic interface of an electronic display device.

2. The method according to claim 1, wherein:

prior to the step of calculating at least one isovist for each positioning set the method comprises:

calculating a path parameter for each user, each path parameter being representative of the path made by a respective user in said physical or extended reality environment to reach the respective positioning point and being calculated from georeferenced position data acquired during said path made by said respective user in said physical or extended reality environment using the electronic acquisition device;

adding each defined path parameter to a respective data unit;

defining a path threshold;

comparing the path parameters of the data units of each positioning set defined in order to group into respective observation sets data units of a respective positioning set having respective path parameters differing from each other by a value lower than the path threshold;

the step of calculating at least one isovist for each positioning set comprises calculating an isovist for each observation set according to the respective positioning and/or aim parameters.

3. The method according to claim 2, wherein after defining the observation sets and prior to the step of calculating at least one isovist for each positioning set, the method comprises the step of updating each defined observation set taking into account descriptive parameters of each user of that respective observation set.

4. The method according to claim 2 or 3, wherein the step of calculating an isovist for each observation set according to the respective positioning and/or aim parameters comprises:

calculating an average positioning parameter for each defined observation set, each average positioning parameter being representative of the average value of the positioning parameters of the respective observation set;

calculating an isovist for each observation set as a function of their respective average positioning parameters.

5. The method according to claim 4, wherein the step of calculating an isovist for each observation set according to the respective positioning and/or aim parameters comprises:

calculating an average aim parameter for each defined observation set, each average aim parameter being representative of the average value of the aim parameters of the respective observation set;

calculating an isovist for each observation set according to their respective average positioning and aim parameters.

6. The method according to claim 2, wherein:

prior to the step of representing each calculated isovist in a graphic interface of an electronic display device, the method comprises the steps of:

collecting via the electronic acquisition device a set of subjective information for each user, each set of subjective information being related to the perception of a respective user within the physical or extended reality environment;

processing a perception parameter for each set of subjective information;

defining an average perception parameter for each defined observation set, each average perception parameter being representative of the average value of the perception parameters for a respective observation set;

and wherein the step of representing each isovist in a graphic interface of an electronic display device comprises:

associating each calculated isovist with a graphical pattern according to the average perception parameter of the respective observation set;

representing each isovist and the corresponding graphical pattern in a representation of the physical or extended reality environment;

displaying said representation in the graphical interface of the electronic display device.

7. A non-transitory computer-readable medium encoded with a computer program for calculating one or more isovists of a physical or extended reality environment, said computer program comprising program codes suitable for performing the steps of:

providing at least one electronic acquisition device configured to obtain a plurality of georeferenced data, comprising position, orientation and configured to take frames of said physical or extended reality environment;

calculating a positioning parameter for each user, each positioning parameter being representative of a positioning point of a respective user in said physical or extended reality environment and being determined from said georeferenced position data acquired when said respective user uses the electronic acquisition device to take a frame of the physical or extended reality environment;

calculating an aim parameter for each user, each aim parameter being representative of the direction of the respective frame of the physical or extended reality environment taken by a user at the respective positioning point and being calculated from said georeferenced orientation data acquired when said respective user uses the electronic acquisition device to take the respective frame;

associating each positioning parameter with a respective aim parameter to define respective data units;

defining a positioning threshold and an aim threshold;

grouping data units having respective positioning parameters and respective aim parameters into respective positioning sets, the step of grouping data units comprising the step of grouping respective positioning sets of data units having respective positioning parameters differing from each other by a value lower than the positioning threshold and respective aim parameters differing from each by a value lower than the aim threshold;

calculating one or more isovists for each positioning set according to the respective positioning and/or aim parameters, at least one of said one or more isovists being related to several users;

representing each isovist calculated in a graphic interface of an electronic display device;

when the program is run on a computer.

\* \* \* \* \*